(12) United States Patent
McIntyre

(10) Patent No.: US 11,338,884 B1
(45) Date of Patent: May 24, 2022

(54) DISCOIDAL BICYCLE BRAKE

(71) Applicant: John McIntyre, Traverse City, MI (US)

(72) Inventor: John McIntyre, Traverse City, MI (US)

( * ) Notice: Subject to any disclaimer, the term of this patent is extended or adjusted under 35 U.S.C. 154(b) by 0 days.

(21) Appl. No.: 17/194,745

(22) Filed: Mar. 8, 2021

(51) Int. Cl.
*B62L 1/08* (2006.01)

(52) U.S. Cl.
CPC ..................... *B62L 1/08* (2013.01)

(58) Field of Classification Search
CPC ...... F16D 55/2245; F16D 49/16; F16D 65/18; F16D 65/095; F16D 2055/0062; F16D 2069/0433; F16D 2121/14; B60T 1/06; B62L 1/00; B62L 1/005; B62L 1/08; B62L 1/16
USPC .................. 188/24.21, 24.22, 24.11–24.15
See application file for complete search history.

(56) References Cited

U.S. PATENT DOCUMENTS

| | | | | |
|---|---|---|---|---|
| 4,611,690 A | * | 9/1986 | Schoch | B62L 1/10 188/24.11 |
| 8,066,104 B2 | * | 11/2011 | D'Aluisio | B60T 11/046 188/24.19 |
| 8,127,896 B2 | * | 3/2012 | Towle | B60T 1/06 188/24.21 |
| 2020/0156734 A1 | | 5/2020 | McIntyre | |

* cited by examiner

*Primary Examiner* — Robert A. Siconolfi
*Assistant Examiner* — San M Aung

(57) ABSTRACT

A discoidal brake for a bicycle comprises a pair of discoids, each of which is mounted on a bicycle member laterally of a wheel rim, one on either side of the wheel. The discoid is pivotally mounted in levered relation on each pivot mount below adjacent and biased away from the wheel rim. A brake shoe is affixed to each discoid to allow camming of the brake shoe into the wheel rim facilitating braking. A control cable is affixed to a control member above the wheel with the control member being connected to the center of a yoke cable. The yoke cable is affixed to each discoid with yoke cable passed partway around the annular component on each discoid.

1 Claim, 1 Drawing Sheet

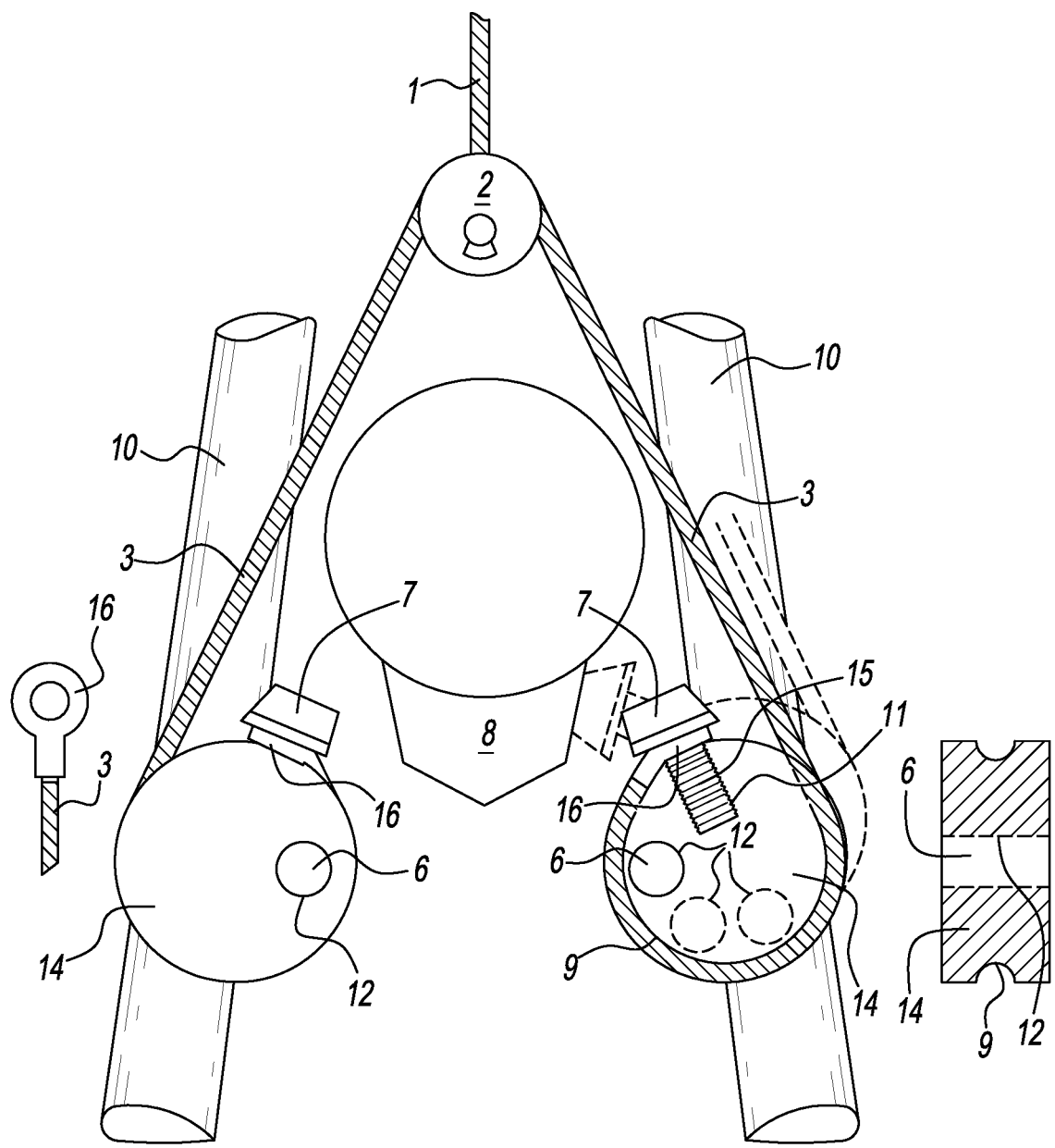

DISCOIDAL BICYCLE BRAKE

FIELD OF THE INVENTION

The invention is in the field of bicycle brakes, and more particularly bicycle brakes of the center-pull and cantilever variety.

BACKGROUND OF THE INVENTION AND DESCRIPTION OF THE RELATED ART

This patent application is a continuation-in-part of patent application Ser. No. 16/192,312. The invention incorporates similar design features such as a pivot mount but differs in combining the pivot mount and brake arm as one complete assembly streamlining and lowering production costs. The invention maintains the benefits from shortened brake lever manipulation while exerting consistent pressure upon the bicycle wheel rim, lessened wheel rim wear, and controlling braking power and decreasing issues jeopardizing cyclist safety.

BRIEF SUMMARY OF THE INVENTION

The present invention comprises a center-pull style bicycle brake having a cylindrical like embodiment henceforth referred to as the discoid with provisions for yoke cable attachment, brake shoe attachment and attachment to the pivot mount. The purpose of the invention is to offer cyclists with a simpler center-pull and cantilever style brake that provides less wear and tear upon the bicycle wheel rim, smooth and safer brake actuation in a relatively compact configuration.

In the illustration of the preferred embodiment of the invention is the relationship of the key elements of the discoid being the brake pad, pivot mount, and the yoke cable attachment.

Shown in the illustrative embodiment of the invention's assembly is the location of the key elements.

As will be understood from the following specification, the bicycle brake can be constructed using inexpensive plastics to metals ranging from aircraft grade aluminum to titanium alloys.

These and other features and advantages of the invention will become apparent from the detailed description below, in light of the accompanying drawing.

BRIEF DESCRIPTION OF THE DRAWINGS

FIG. 1 is a front view of an embodiment of the discoidal brake invention which includes a side and sectional view of the discoid and yoke cable components.

DETAILED DESCRIPTION OF THE INVENTION

It is fully understood that as most bicycle brakes, the discoidal bicycle brake invention is activated by a handlebar mounted brake lever. It is also fully understood the invention as with all center-pull bicycle brakes, has a frame mounted component to secure a control cable (1) shown in FIG. 1. Continuing to reference FIG. 1, the discoid (14) has its pivot mount (6) attached to a bicycle member (10) such as the fork and/or seat stays. Note the strategic placement of the following components on the discoid (14), the brake shoe (7), the pivot mount (6) and the secured yoke cable (3). When the brake lever is squeezed: the control cable (1) raises the control member (2) that cradles and lifts the yoke cable (3), raising the yoke cable (3) which as a result of the pivot mount (6) forces the brake shoe (7) against the bicycle wheel rim (8) facilitating braking. The location of the pivot mount (6) creates camming leverage. Note that the yoke cable (3) rests inside a groove or annular component (9) of the outside diameter of the discoid (14). The annular component (9) provides guidance of the yoke cable (3). The yoke cable (3) has closed loop ends (16) allowing the brake shoe threaded stud (15) to pass-through securing the yoke cable (3) to the discoid (14). Not shown is a spring that retracts the discoid to the original stand-by position as illustrated.

Again referring to FIG. 1, the discoid (14) is drilled and tapped (11) for the installation of the brake shoe (7) and a drilled though hole (12) is for the installation to the pivot mount (6). Note location of each element on the discoid (14). The discoid (14) has a groove or annular component (9) routing the yoke cable (3) and increasing the mechanical advantage of the brake when actuated. The discoid (14) has an off-center pivot mounting hole (12) for the pivot mount (6) allows powerful camming action while the yoke cable (3) offers circumferential support of the discoid (14). The location of the pivot mount (6) and/or varying the outside diameter of the discoid (14) can increase or decrease braking power. The yoke cable (3) is secured to the discoid (14) by inserting the threaded stud (15) portion of the brake shoe (7) through each of the closed ends (16) of the yoke cable (3) before installing the brake shoe (7). Also shown are additional pivot mounting holes (12) in the discoid (14) to allow mounting options and/or lighten weight of the discoid (14). The discoid (14) can be skeletonized for weight reduction or have band like construction for performance focused markets.

It will finally be understood that the disclosed embodiments represent presently preferred forms of the invention, but are intended to be explanatory rather than limiting of the invention. Reasonable variation and modification of the invention as disclosed in the foregoing disclosure and drawings are possible without departing from the scope of invention. The scope of the invention is defined by the following claim.

What is claimed is:

1. A discoidal brake for a bicycle comprising a pair of pivot mounts, each of which is mounted on a bicycle member laterally of a wheel rim, one on either side of the wheel, a brake shoe affixed to each discoid, the discoid pivotally mounted in levered relation on each pivot mount with a control cable affixed to control member above the wheel, the control member connected to the center of a yoke cable affixed to the discoid, a groove in the discoid affixed on each pivot mount and yoke cable situated partway around the groove.

* * * * *